US008508585B2

(12) United States Patent
Yamamoto et al.

(10) Patent No.: US 8,508,585 B2
(45) Date of Patent: Aug. 13, 2013

(54) THREE-DIMENSIONAL VIDEO REPRODUCTION APPARATUS, THREE-DIMENSIONAL VIDEO REPRODUCTION METHOD, AND INTEGRATED CIRCUIT

(75) Inventors: Nariaki Yamamoto, Hyogo (JP); Akira Matsubara, Osaka (JP)

(73) Assignee: Panasonic Corporation, Osaka (JP)

( * ) Notice: Subject to any disclaimer, the term of this patent is extended or adjusted under 35 U.S.C. 154(b) by 362 days.

(21) Appl. No.: 13/050,163

(22) Filed: Mar. 17, 2011

(65) Prior Publication Data

US 2011/0228060 A1    Sep. 22, 2011

(30) Foreign Application Priority Data

Mar. 18, 2010  (JP) ................................. 2010-062330

(51) Int. Cl.
*H04N 13/04*    (2006.01)
(52) U.S. Cl.
USPC ....................................... 348/55; 375/240.25
(58) Field of Classification Search
USPC ................. 348/55, E13.075; 375/240.25
See application file for complete search history.

(56) References Cited

U.S. PATENT DOCUMENTS

| 7,542,098 B2 * | 6/2009 | Mamba et al. ............... 348/569 |
| 2006/0092188 A1 | 5/2006 | Mamba et al. |
| 2006/0176312 A1 * | 8/2006 | Kuno ............................ 345/589 |
| 2006/0209082 A1 * | 9/2006 | Shimizu et al. ............... 345/604 |
| 2006/0274210 A1 * | 12/2006 | Kim ................................ 348/624 |
| 2009/0009591 A1 * | 1/2009 | Yabe et al. ........................ 348/46 |
| 2009/0315979 A1 * | 12/2009 | Jung et al. ........................ 348/43 |
| 2010/0134592 A1 * | 6/2010 | Kim et al. ........................ 348/43 |
| 2010/0171817 A1 * | 7/2010 | Tourapis et al. ................. 348/51 |

FOREIGN PATENT DOCUMENTS

| JP | 2006-109173 | | 4/2006 |
| JP | 2006-119509 | | 5/2006 |
| JP | 2007-134883 | | 5/2007 |
| JP | 2007134883 A | * | 5/2007 |

OTHER PUBLICATIONS

Machine translation of Iwasa et al. (JP 2007-134883 A).*

* cited by examiner

*Primary Examiner* — Christopher S Kelley
*Assistant Examiner* — Ana Picon-Feliciano
(74) *Attorney, Agent, or Firm* — Wenderoth, Lind & Ponack, L.L.P.

(57) ABSTRACT

A three-dimensional video reproduction apparatus includes: a video decoder unit which generates a right-eye video signal and a left-eye video signal; a graphics decoder unit which generates a right-eye graphics signal and a left-eye graphics signal; a synthesizing unit which synthesizes the right-eye video signal and the right-eye graphics signal and synthesizes the left-eye video signal and the left-eye graphics signal, to generate a right-eye output signal and a left-eye output signal; and an output unit which reproduces the three-dimensional video by alternately outputting the right-eye and left-eye output signals. When two adjacent pixels in the right-eye or left-eye output signal are represented by a common chrominance signal, and are generated respectively using a video signal and a graphics signal, the synthesizing unit generates the common chrominance signal such that a synthesis ratio of the video signal and the graphics signal is biased in favor of one of these.

7 Claims, 12 Drawing Sheets

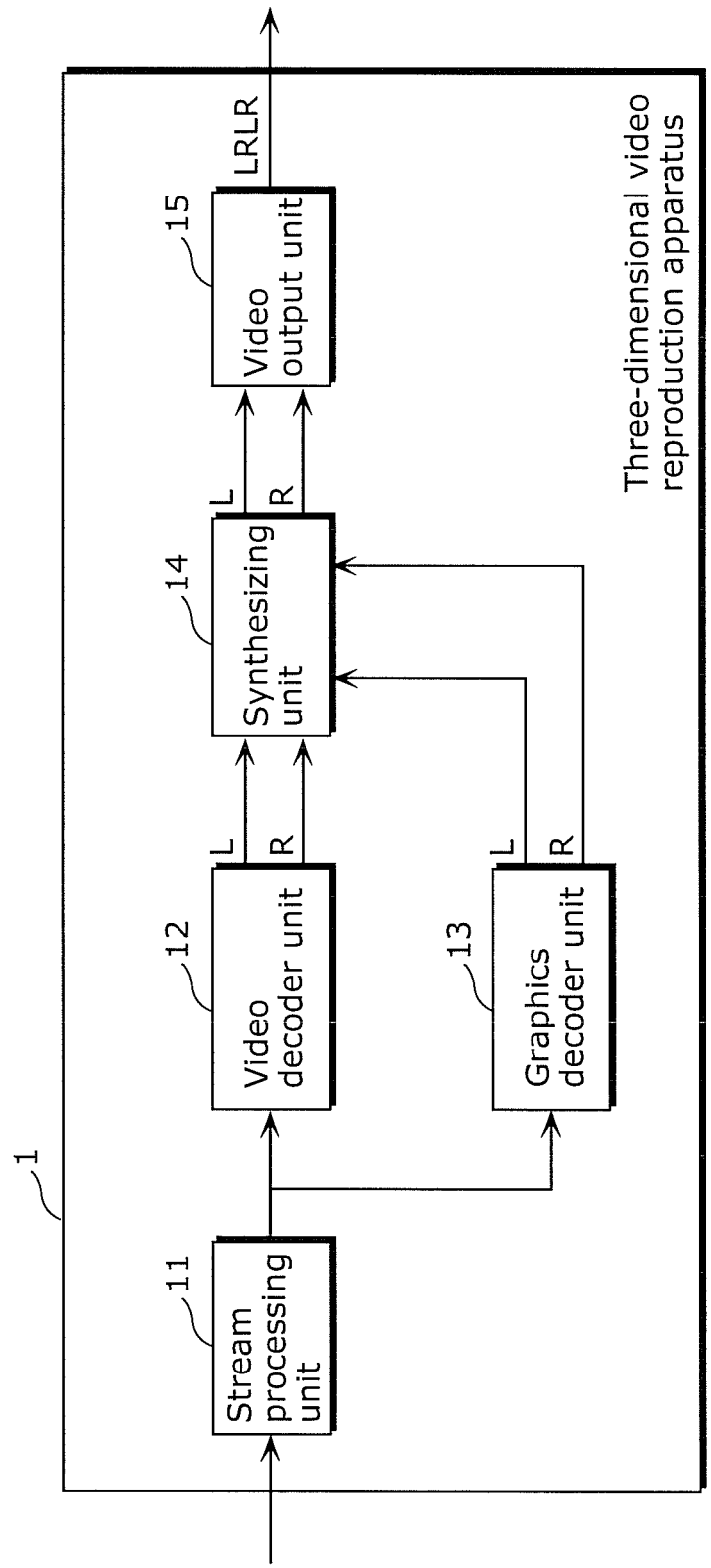

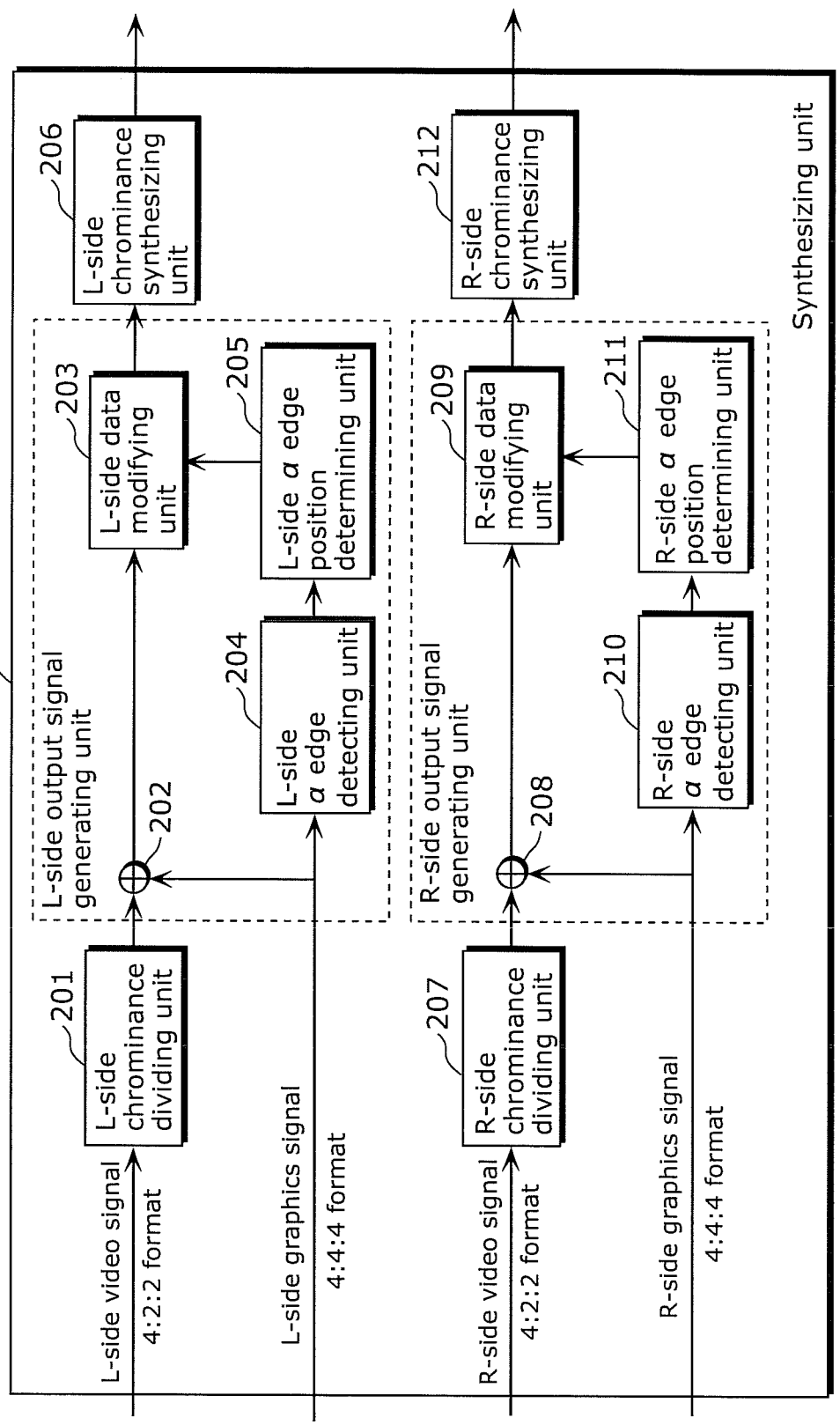

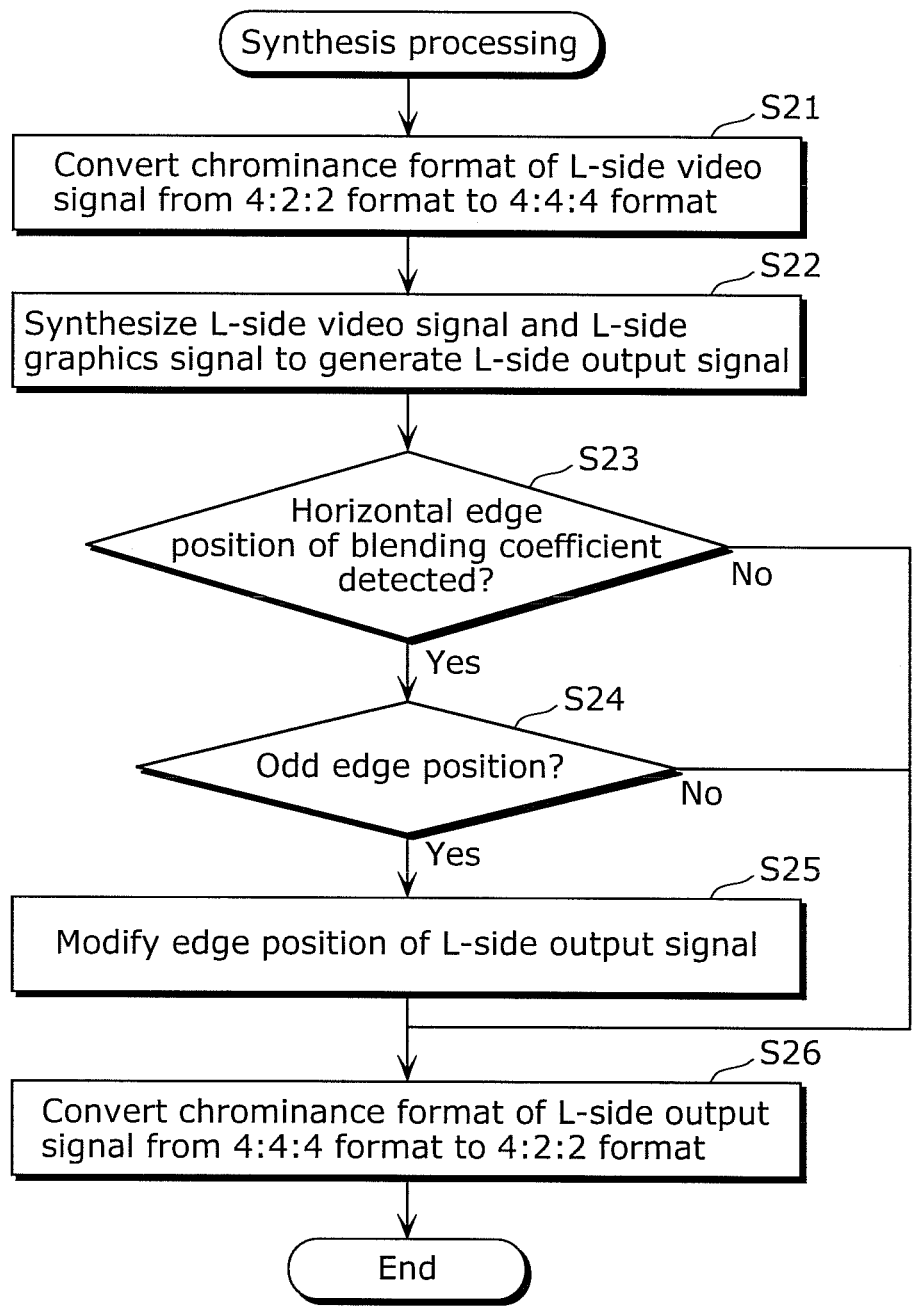

Fig. 3

| Pixel position | 0 | 1 | 2 | 3 | 4 | 5 | 6 | 7 |
|---|---|---|---|---|---|---|---|---|
| Y | $Y_0$ | $Y_1$ | $Y_2$ | $Y_3$ | $Y_4$ | $Y_5$ | $Y_6$ | $Y_7$ |
| Cb | $Cb_{01}$ | | $Cb_{23}$ | | $Cb_{45}$ | | $Cb_{67}$ | |
| Cr | $Cr_{01}$ | | $Cr_{23}$ | | $Cr_{45}$ | | $Cr_{67}$ | |

Chrominance division

| Pixel position | 0 | 1 | 2 | 3 | 4 | 5 | 6 | 7 |
|---|---|---|---|---|---|---|---|---|
| Y | $Y_0$ | $Y_1$ | $Y_2$ | $Y_3$ | $Y_4$ | $Y_5$ | $Y_6$ | $Y_7$ |
| Cb | $Cb_0$ | $Cb_1$ | $Cb_2$ | $Cb_3$ | $Cb_4$ | $Cb_5$ | $Cb_6$ | $Cb_7$ |
| Cr | $Cr_0$ | $Cr_1$ | $Cr_2$ | $Cr_3$ | $Cr_4$ | $Cr_5$ | $Cr_6$ | $Cr_7$ |

| Pixel position | 0 | 1 | 2 | 3 | 4 | 5 | 6 | 7 |
|---|---|---|---|---|---|---|---|---|
| Blending coefficient | 0 | 0 | 1 | 1 | 1 | 1 | 0 | 0 |
| Y | $Y_{G0}$ | $Y_{G1}$ | $Y_{G2}$ | $Y_{G3}$ | $Y_{G4}$ | $Y_{G5}$ | $Y_{G6}$ | $Y_{G7}$ |
| Cb | $Cb_{G0}$ | $Cb_{G1}$ | $Cb_{G2}$ | $Cb_{G3}$ | $Cb_{G4}$ | $Cb_{G5}$ | $Cb_{G6}$ | $Cb_{G7}$ |
| Cr | $Cr_{G0}$ | $Cr_{G1}$ | $Cr_{G2}$ | $Cr_{G3}$ | $Cr_{G4}$ | $Cr_{G5}$ | $Cr_{G6}$ | $Cr_{G7}$ |

Fig. 5

| Pixel position | 0 | 1 | 2 | 3 | 4 | 5 | 6 | 7 |
|---|---|---|---|---|---|---|---|---|
| Y | $Y_0$ | $Y_1$ | $Y_2$ | $Y_3$ | $Y_4$ | $Y_5$ | $Y_6$ | $Y_7$ |
| Cb | $Cb_{01}$ | | $Cb_{23}$ | | $Cb_{45}$ | | $Cb_{67}$ | |
| Cr | $Cr_{01}$ | | $Cr_{23}$ | | $Cr_{45}$ | | $Cr_{67}$ | |

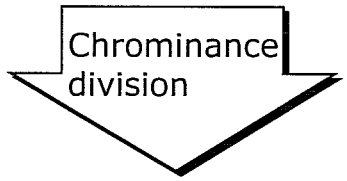
Chrominance division

| Pixel position | 0 | 1 | 2 | 3 | 4 | 5 | 6 | 7 |
|---|---|---|---|---|---|---|---|---|
| Y | $Y_0$ | $Y_1$ | $Y_2$ | $Y_3$ | $Y_4$ | $Y_5$ | $Y_6$ | $Y_7$ |
| Cb | $Cb_0$ | $Cb_1$ | $Cb_2$ | $Cb_3$ | $Cb_4$ | $Cb_5$ | $Cb_6$ | $Cb_7$ |
| Cr | $Cr_0$ | $Cr_1$ | $Cr_2$ | $Cr_3$ | $Cr_4$ | $Cr_5$ | $Cr_6$ | $Cr_7$ |

| Pixel position | 0 | 1 | 2 | 3 | 4 | 5 | 6 | 7 |
|---|---|---|---|---|---|---|---|---|
| Blending coefficient | 0 | 1 | 1 | 1 | 1 | 0 | 0 | 0 |
| Y | $Y_{G0}$ | $Y_{G1}$ | $Y_{G2}$ | $Y_{G3}$ | $Y_{G4}$ | $Y_{G5}$ | $Y_{G6}$ | $Y_{G7}$ |
| Cb | $Cb_{G0}$ | $Cb_{G1}$ | $Cb_{G2}$ | $Cb_{G3}$ | $Cb_{G4}$ | $Cb_{G5}$ | $Cb_{G6}$ | $Cb_{G7}$ |
| Cr | $Cr_{G0}$ | $Cr_{G1}$ | $Cr_{G2}$ | $Cr_{G3}$ | $Cr_{G4}$ | $Cr_{G5}$ | $Cr_{G6}$ | $Cr_{G7}$ |

Fig. 7A

| Pixel position | 0 | 1 | 2 | 3 | 4 | 5 | 6 | 7 |
|---|---|---|---|---|---|---|---|---|
| Y | $Y_{L0}$ | $Y_{L1}$ | $Y_{L2}$ | $Y_{L3}$ | $Y_{L4}$ | $Y_{L5}$ | $Y_{L6}$ | $Y_{L7}$ |
| Cb | $Cb_{L0}$ | $Cb_{L1}$ | $Cb_{L2}$ | $Cb_{L3}$ | $Cb_{L4}$ | $Cb_{L5}$ | $Cb_{L6}$ | $Cb_{L7}$ |
| Cr | $Cr_{L0}$ | $Cr_{L1}$ | $Cr_{L2}$ | $Cr_{L3}$ | $Cr_{L4}$ | $Cr_{L5}$ | $Cr_{L6}$ | $Cr_{L7}$ |

| Pixel position | 0 | 1 | 2 | 3 | 4 | 5 | 6 | 7 |
|---|---|---|---|---|---|---|---|---|
| Blending coefficient | 0 | 0 | 0 | 0 | 1 | 1 | 1 | 1 |
| Y | — | — | — | — | $Y_{G0}$ | $Y_{G1}$ | $Y_{G2}$ | $Y_{G3}$ |
| Cb | — | — | — | — | $Cb_{G0}$ | $Cb_{G1}$ | $Cb_{G2}$ | $Cb_{G3}$ |
| Cr | — | — | — | — | $Cr_{G0}$ | $Cr_{G1}$ | $Cr_{G2}$ | $Cr_{G3}$ |

Fig. 7B

| Pixel position | 0 | 1 | 2 | 3 | 4 | 5 | 6 | 7 |
|---|---|---|---|---|---|---|---|---|
| Y | $Y_{R0}$ | $Y_{R1}$ | $Y_{R2}$ | $Y_{R3}$ | $Y_{R4}$ | $Y_{R5}$ | $Y_{R6}$ | $Y_{R7}$ |
| Cb | $Cb_{R0}$ | $Cb_{R1}$ | $Cb_{R2}$ | $Cb_{R3}$ | $Cb_{R4}$ | $Cb_{R5}$ | $Cb_{R6}$ | $Cb_{R7}$ |
| Cr | $Cr_{R0}$ | $Cr_{R1}$ | $Cr_{R2}$ | $Cr_{R3}$ | $Cr_{R4}$ | $Cr_{R5}$ | $Cr_{R6}$ | $Cr_{R7}$ |

| Pixel position | 0 | 1 | 2 | 3 | 4 | 5 | 6 | 7 |
|---|---|---|---|---|---|---|---|---|
| Blending coefficient | 0 | 1 | 1 | 1 | 1 | 0 | 0 | 0 |
| Y | — | $Y_{G0}$ | $Y_{G1}$ | $Y_{G2}$ | $Y_{G3}$ | — | — | — |
| Cb | — | $Cb_{G0}$ | $Cb_{G1}$ | $Cb_{G2}$ | $Cb_{G3}$ | — | — | — |
| Cr | — | $Cr_{G0}$ | $Cr_{G1}$ | $Cr_{G2}$ | $Cr_{G3}$ | — | — | — |

Fig. 8A

| Pixel position | 0 | 1 | 2 | 3 | 4 | 5 | 6 | 7 |
|---|---|---|---|---|---|---|---|---|
| Y | $Y_{L0}$ | $Y_{L1}$ | $Y_{L2}$ | $Y_{L3}$ | $Y_{G0}$ | $Y_{G1}$ | $Y_{G2}$ | $Y_{G3}$ |
| Cb | $Cb_{L0}$ | $Cb_{L1}$ | $Cb_{L2}$ | $Cb_{L3}$ | $Cb_{G0}$ | $Cb_{G1}$ | $Cb_{G2}$ | $Cb_{G3}$ |
| Cr | $Cr_{L0}$ | $Cr_{L1}$ | $Cr_{L2}$ | $Cr_{L3}$ | $Cr_{G0}$ | $Cr_{G1}$ | $Cr_{G2}$ | $Cr_{G3}$ |

Fig. 8B

| Pixel position | 0 | 1 | 2 | 3 | 4 | 5 | 6 | 7 |
|---|---|---|---|---|---|---|---|---|
| Y | $Y_{R0}$ | $Y_{G0}$ | $Y_{G1}$ | $Y_{G2}$ | $Y_{G3}$ | $Y_{R5}$ | $Y_{R6}$ | $Y_{R7}$ |
| Cb | $Cb_{R0}$ | $Cb_{G0}$ | $Cb_{G1}$ | $Cb_{G2}$ | $Cb_{G3}$ | $Cb_{R5}$ | $Cb_{R6}$ | $Cb_{R7}$ |
| Cr | $Cr_{R0}$ | $Cr_{G0}$ | $Cr_{G1}$ | $Cr_{G2}$ | $Cr_{G3}$ | $Cr_{R5}$ | $Cr_{R6}$ | $Cr_{R7}$ |

Modification

| Pixel position | 0 | 1 | 2 | 3 | 4 | 5 | 6 | 7 |
|---|---|---|---|---|---|---|---|---|
| Y | $Y_{G0}$ | $Y_{G0}$ | $Y_{G1}$ | $Y_{G2}$ | $Y_{G3}$ | $Y_{G3}$ | $Y_{R6}$ | $Y_{R7}$ |
| Cb | $Cb_{G0}$ | $Cb_{G0}$ | $Cb_{G1}$ | $Cb_{G2}$ | $Cb_{G3}$ | $Cb_{G3}$ | $Cb_{R6}$ | $Cb_{R7}$ |
| Cr | $Cr_{G0}$ | $Cr_{G0}$ | $Cr_{G1}$ | $Cr_{G2}$ | $Cr_{G3}$ | $Cr_{G3}$ | $Cr_{R6}$ | $Cr_{R7}$ |

Fig. 10
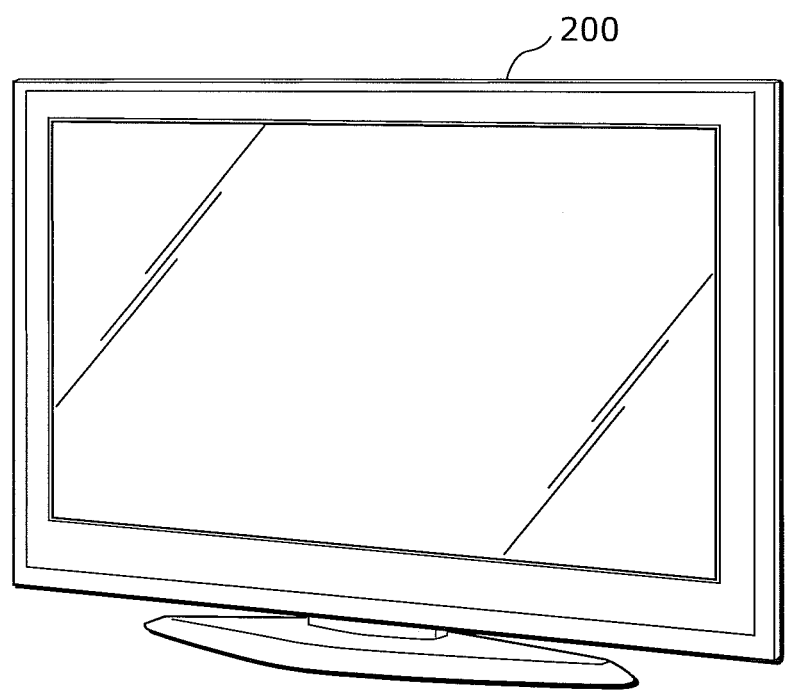
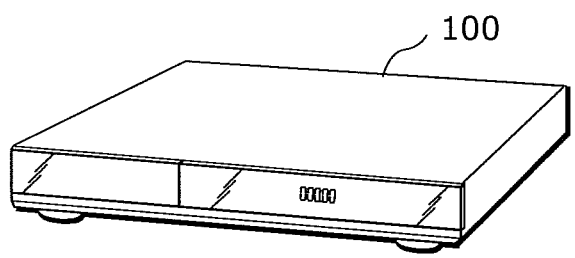

THREE-DIMENSIONAL VIDEO REPRODUCTION APPARATUS, THREE-DIMENSIONAL VIDEO REPRODUCTION METHOD, AND INTEGRATED CIRCUIT

BACKGROUND OF THE INVENTION (1) Field of the Invention

The present invention relates to three-dimensional video reproduction apparatuses which superimpose a sub video on a main video that is a three-dimensional video (3D video).

(2) Description of the Related Art

Recent years have seen a rapid spread use of recording media such as Blu-ray discs for recording data obtained by digitally coding and multiplexing a main video signal corresponding to a three-dimensional video and a sub video signal such as subtitles.

A main video signal conforms to the 4:2:2 format as one of the chrominance formats defined by the CCIR (International Radio consultative Committee), and is composed of a luminance signal using 8 bits for each pixel and a chrominance signal Db/Cr using 8 bits for each of two pixels. On the other hand, a sub video signal conforms to the 4:2:2 format as another one of the chrominance formats, and is composed of a luminance signal using 8 bits for each pixel and chrominance data Cb/Cr using 8 bits for each pixel.

When superimposing a sub video signal on a main video signal and reproducing the resulting video signal, there is a need to match the chrominance formats thereof before the superimposition. For example, a main video signal is converted from the 4:2:2 format to the 4:4:4 format, and then a sub video signal is superimposed on the main signal having the 4:4:4 format. Alternatively, the chrominance format of a sub video signal is converted from the 4:4:4 format to the 4:2:2 format, and then the sub video signal is superimposed on the main signal having the 4:2:2 format.

There are some known techniques for suppressing occurrence of a color different from the original color at an edge portion of a sub video or another portion when superimposing a main video and a sub video and displaying the resulting video in this way (for example, see Patent Reference 1 (Japanese Unexamined Patent Application Publication No. 2007-134883)).

SUMMARY OF THE INVENTION

However, when a main video with a sub video superimposed thereon is three-dimensionally reproduced, the display position of a right-eye sub video and the display position of a left-eye sub video are mutually different. For this reason, a problem arises that a user visually recognizes flickering in the three-dimensional video, due to the difference in the display positions between an edge portion of the superimposed right-eye sub video and an edge portion of the superimposed left-eye sub video.

The present invention aims to provide a three-dimensional video reproduction apparatus which suppresses occurrence of flickering at an edge portion of a sub video when superimposing the sub video on a main video corresponding to a three-dimensional video and reproducing the resulting video.

A three-dimensional video reproduction apparatus according to an embodiment of the present invention is intended to reproduce a three-dimensional video. More specifically, the three-dimensional video reproduction apparatus includes a video decoder which decodes a video stream to generate a right-eye video signal and a left-eye video signal which have a parallax with respect to each other; a graphics decoder which decodes a graphics stream to generate a right-eye graphics signal and a left-eye graphics signal which have a parallax with respect to each other; a synthesizing unit configured to synthesize the right-eye video signal and the right-eye graphics signal to generate a right-eye output signal, and synthesize the left-eye video signal and the left-eye graphics signal to generate a left-eye output signal; and an output unit configured to reproduce the three-dimensional video by alternately outputting the right-eye output signal and the left-eye output signal generated by the synthesizing unit. The synthesizing unit is configured to: generate a common chrominance signal by biasing a synthesis ratio of the right-eye video signal and the right-eye graphics signal in favor of one of the right-eye video signal and the right-eye graphics signal, in a case where (i) adjacent two pixels in the right-eye output signal are represented by the common chrominance signal and (ii) one of the adjacent two pixels is generated using the right-eye video signal and the other one of the adjacent two pixels is generated using the right-eye graphics signal; and generate a common chrominance signal by biasing a synthesis ratio of the left-eye video signal and the left-eye graphics signal in favor of one of the left-eye video signal and the left-eye graphics signal, in a case where (i) adjacent two pixels in the left-eye output signal are represented by the common chrominance signal and (ii) one of the adjacent two pixels is generated using the left-eye video signal and the other one of the adjacent two pixels is generated using the left-eye graphics signal.

With this structure, it is possible to suppress occurrence of flickering at an edge portion in the graphics when superimposing a graphics signal corresponding to a sub video signal on a video signal corresponding to a main video signal and reproducing the resulting video signal.

As an example, each of the right-eye video signal and the left-eye video signal may have a 4:2:2 format as a chrominance format. Likewise, each of the right-eye graphics signal and the left-eye graphics signal may have a 4:4:4 format as a chrominance format. Furthermore, the three-dimensional video reproduction apparatus may obtain transparency information indicating which one of the right-eye video signal and the right-eye graphics signal is used to generate each of the pixels of the right-eye output signal, and which one of the left-eye video signal and the left-eye graphics signal is used to generate each of the pixels of the left-eye output signal. The synthesizing unit may include: a chrominance dividing unit configured to convert the chrominance format of each of the right-eye video signal and the left-eye video signal from the 4:2:2 format to the 4:4:4 format; a right-eye output signal generating unit configured to generate the right-eye output signal having the 4:4:4 format as the chrominance format, by synthesizing the right-eye video signal and the right-eye graphics signal each having the 4:4:4 format as the chrominance format, according to the transparency information; a left-eye output signal generating unit configured to generate the left-eye output signal having the 4:4:4 format as the chrominance format, by synthesizing the left-eye video signal and the left-eye graphics signal each having the 4:4:4 format as the chrominance format, according to the transparency information; and a chrominance generating unit configured to convert the chrominance format of each of the right-eye output signal and the left-eye output signal from the 4:4:4 format to the 4:2:2 format. The right-eye output signal generating unit may be configured to detect, in the right-eye output signal, a position that is (i) a boundary between two adjacent pixels that are represented using the common chrominance signal and (ii) an edge position at which transparency information changes, and generate the common chrominance signal at the edge position by biasing the synthesis ratio of the right-eye video signal and the right-eye graphics signal in favor of one of the right-eye video signal and the right-eye graphics signal. The left-eye output signal generating unit may be configured to detect, in the right-eye output signal, a position that is (i) a boundary between two adjacent pixels that are represented using the common chrominance signal and (ii) an edge position at which transparency information changes, and generate the common chrominance signal at the edge position by biasing the synthesis ratio of the left-eye video signal and the left-eye graphics signal in favor of one of the left-eye video signal and the left-eye graphics signal.

In addition, the right-eye output signal generating unit may be configured to generate the common chrominance signal at the edge position, using only one of the chrominance signals of the right-eye video signal and the right-eye graphics signal. Likewise, the left-eye output signal generating unit may be configured to generate the common chrominance signal at the edge position, using only one of the chrominance signals of the left-eye video signal and the left-eye graphics signal. In this way, it is possible to suppress occurrence of flickering more effectively.

A three-dimensional video reproduction apparatus according to an embodiment of the present invention is intended to reproduce a three-dimensional video. More specifically, the three-dimensional video reproduction apparatus includes a video decoder which decodes a video stream to generate a right-eye video signal and a left-eye video signal which have a parallax with respect to each other; a graphics decoder which decodes a graphics stream to generate a right-eye graphics signal and a left-eye graphics signal which have a parallax with respect to each other; a synthesizing unit configured to synthesize the right-eye video signal and the right-eye graphics signal to generate a right-eye output signal, and synthesize the left-eye video signal and the left-eye graphics signal to generate a left-eye output signal; and an output unit configured to reproduce the three-dimensional video by alternately outputting the right-eye output signal and the left-eye output signal generated by the synthesizing unit. The graphics decoder includes: a decoding unit configured to decode the graphics stream to generate (i) a plane graphics signal, (ii) a right-eye side horizontal shift amount that is a horizontal shift amount of the plane graphics signal for generating the right-eye graphics signal, and (iii) a left-eye side horizontal shift amount that is a horizontal shift amount of the plane graphics signal for generating the left-eye graphics signal; and a parallax adding unit configured to horizontally shift the plane graphics signal to one of directions by the right-eye side horizontal shift amount to generate the right-eye graphics signal, and horizontally shift the plane graphics signal to the other one of the directions by the left-eye side horizontal shift amount to generate the left-eye graphics signal. The parallax adding unit may be configured to overwrite one of the right-eye side horizontal shift amount and the left-eye side horizontal shift amount on the other one of the horizontal shift amounts, and then generate the right-eye graphics signal and the left-eye graphics signal, in the case where one of the right-eye side horizontal shift amount and the left-eye side horizontal shift amount is an even number of pixels and the other one of the horizontal shift amounts is an odd number of pixels.

A three-dimensional video reproduction method according to an embodiment of the present invention is intended to reproduce a three-dimensional video. More specifically, the three-dimensional video reproduction method involves: decoding a video stream to generate a right-eye video signal and a left-eye video signal which have a parallax with respect to each other; decoding a graphics stream to generate a right-eye graphics signal and a left-eye graphics signal which have a parallax with respect to each other; synthesizing the right-eye video signal and the right-eye graphics signal to generate a right-eye output signal, and synthesizing the left-eye video signal and the left-eye graphics signal to generate a left-eye output signal; and reproducing the three-dimensional video by alternately outputting the right-eye output signal and the left-eye output signal generated in the synthesizing. In the synthesizing, a common chrominance signal is generated by biasing a synthesis ratio of the right-eye video signal and the right-eye graphics signal in favor of one of the right-eye video signal and the right-eye graphics signal, in a case where (i) adjacent two pixels in the right-eye output signal are represented by the common chrominance signal and (ii) one of the adjacent two pixels is generated using the right-eye video signal and the other one of the adjacent two pixels is generated using the right-eye graphics signal; and a common chrominance signal is generated by biasing a synthesis ratio of the left-eye video signal and the left-eye graphics signal in favor of one of the left-eye video signal and the left-eye graphics signal, in a case where (i) adjacent two pixels in the left-eye output signal are represented by the common chrominance signal and (ii) one of the adjacent two pixels is generated using the left-eye video signal and the other one of the adjacent two pixels is generated using the left-eye graphics signal.

An integrated circuit according to an embodiment of the present invention is intended to reproduce a three-dimensional video. More specifically, the integrated circuit includes a video decoder which decodes a video stream to generate a right-eye video signal and a left-eye video signal which have a parallax with respect to each other; a graphics decoder which decodes a graphics stream to generate a right-eye graphics signal and a left-eye graphics signal which have a parallax with respect to each other; a synthesizing unit configured to synthesize the right-eye video signal and the right-eye graphics signal to generate a right-eye output signal, and synthesize the left-eye video signal and the left-eye graphics signal to generate a left-eye output signal; and an output unit configured to reproduce the three-dimensional video by alternately outputting the right-eye output signal and the left-eye output signal generated by the synthesizing unit. The synthesizing unit is configured to: generate a common chrominance signal by biasing a synthesis ratio of the right-eye video signal and the right-eye graphics signal in favor of one of the right-eye video signal and the right-eye graphics signal, in a case where (i) adjacent two pixels in the right-eye output signal are represented by the common chrominance signal and (ii) one of the adjacent two pixels is generated using the right-eye video signal and the other one of the adjacent two pixels is generated using the right-eye graphics signal; and generate a common chrominance signal by biasing a synthesis ratio of the left-eye video signal and the left-eye graphics signal in favor of one of the left-eye video signal and the left-eye graphics signal, in a case where (i) adjacent two pixels in the left-eye output signal are represented by the common chrominance signal and (ii) one of the adjacent two pixels is generated using the left-eye video signal and the other one of the adjacent two pixels is generated using the left-eye graphics signal.

As described above, the three-dimensional video reproduction apparatus according to the present invention makes it possible to suppress occurrence of flickering at an edge portion of a sub video, when superimposing the sub video on the main video corresponding to the three-dimensional video and reproducing the resulting video.

Further Information about Technical Background to this Application

The disclosure of Japanese Patent Application No. 2010-062330 filed on Mar. 18, 2010 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 1A is a block diagram showing a configuration of a three-dimensional video reproduction apparatus according to Embodiment 1;

FIG. 2A is a block diagram showing a structure of a synthesizing unit according to Embodiment 1;

FIG. 2B is a flowchart indicating operations performed by the synthesizing unit according to Embodiment 1;

FIG. 3 is a diagram illustrating examples of an L-side video signal and an L-side graphics signal in Embodiment 1;

FIG. 5 is a diagram illustrating other examples of an L-side video signal and an L-side graphics signal in Embodiment 1;

FIG. 7A is a diagram illustrating examples of an L-side video signal and an L-side graphics signal in Embodiment 1;

FIG. 7B is a diagram illustrating examples of an R-side video signal and an R-side graphics signal in Embodiment 1;

FIG. 8A is a diagram illustrating an L-side output signal obtained by synthesizing the L-side video signal and the L-side graphics signal in FIG. 7A;

FIG. 8B is a diagram illustrating a process of modifying an R-side output signal obtained by synthesizing the R-side video signal and the R-side graphics signal in FIG. 7B;

FIG. 10 is an external perspective view of an apparatus which mounts the three-dimensional video reproduction apparatus according to Embodiment 1 or Embodiment 2.

DESCRIPTION OF THE PREFERRED EMBODIMENT(S)

Hereinafter, embodiments of the present invention are described with reference to the drawings.

Embodiment 1

Figure 1B:
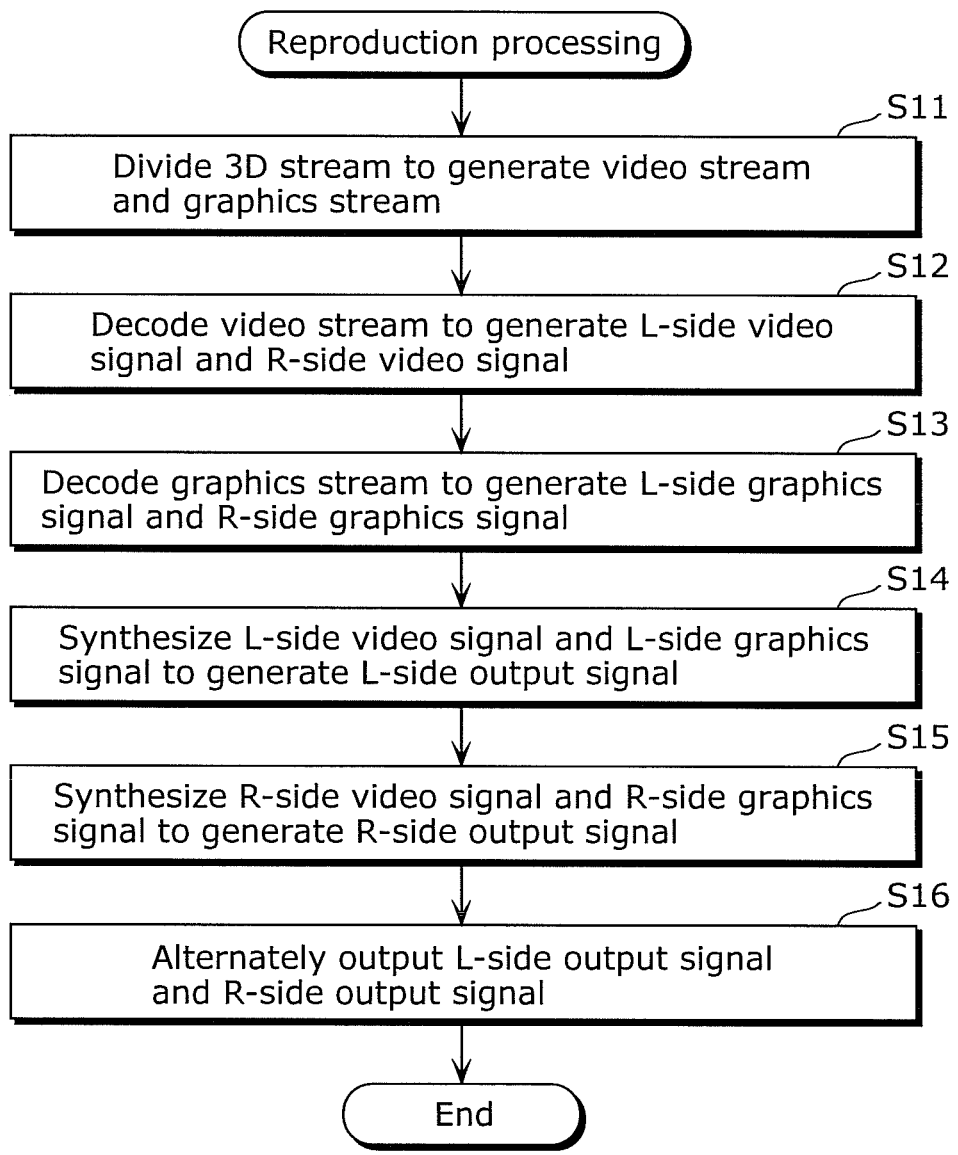
FIG. 1B is a flowchart indicating operations performed by the three-dimensional video reproduction apparatus according to Embodiment 1.

FIG. 1A is a block diagram showing a configuration of a three-dimensional video reproduction apparatus according to this embodiment. FIG. 1B is a flowchart indicating operations performed by the three-dimensional video reproduction apparatus in this embodiment. As shown in FIG. 1A, the three-dimensional video reproduction apparatus 1 includes: a stream processing unit 11, a video decoder unit 12, a graphics decoder unit 13, a synthesizing unit 14, and a video output unit 15. The stream processing unit 11 obtains the 3D stream, divides the obtained 3D stream into a video stream and a graphics stream (S11). Next, the stream processing unit 11 outputs the video stream to the video decoder unit 12, and the graphics stream to the graphics decoder unit 13. Here, in the case of separately obtaining the video stream and the graphics stream, the stream processing unit 11 may not be provided.

The video decoder unit 12 decodes the video stream obtained from the stream processing unit 11 to generate an L-side (left-eye) video signal and an R-side (right-eye) video signal (S12). Next, the video decoder unit 12 outputs the L-side video signal and the R-side video signal to the synthesizing unit 14. Here, the L-side video signal and the R-side video signal are typically main video signals such as moving picture signals and three-dimensional signals having a parallax with respect to each other.

In the case of a two-plane parameterization in which right-side graphics and left-side graphics are provided for a graphics stream, the graphics decoder unit 13 decodes the graphics stream obtained from the stream processing unit 11 to generate an L-side graphics signal and an R-side graphics signal (S13). Next, the graphics decoder unit 13 outputs, to the synthesizing unit 14, the L-side graphics signal and the R-side graphics signal. Here, the L-side graphics signal and the R-side graphics signal are typically sub video signals such as subtitles and menus superimposed on main video signals and three-dimensional video signals having a parallax with respect to each other.

The synthesizing unit 14 synthesizes the L-side video signal obtained from the video decoder unit 12 and the L-side graphics signal obtained from the graphics decoder unit 13 to generate an L-side output signal (S14). Likewise, the video decoder unit 12 synthesizes the R-side video signal obtained from the video decoder unit 12 and the R-side graphics signal obtained from the graphics decoder unit 13 to generate an R-side output signal (S15). Next, the synthesizing unit 14 outputs, to the video output unit 15, the L-side output signal and the R-side output signal.

The video output unit 15 alternately outputs, for each frame (picture), the L-side video signal and the R-side video signal obtained from the synthesizing unit 14, according to a predetermined transmission scheme (S16). Displaying the signal output from the video output unit 15 enables a user to view a three-dimensional video.

FIG. 2A is a block diagram showing a structure of a synthesizing unit 14 in this embodiment. FIG. 2B is a flowchart indicating operations performed by the synthesizing unit 14. The synthesizing unit 14 includes: an L-side chrominance dividing unit 201, an L-side superimposing unit 202, an L-side data modifying unit 203, an L-side α edge detecting unit 204, an L-side α edge position determining unit 205, an L-side chrominance synthesizing unit 206, an R-side chrominance dividing unit 207, an R-side superimposing unit 208, an R-side data modifying unit 209, an R-side α edge detecting unit 210, an R-side α edge position determining unit 211, and an R-side chrominance synthesizing unit 212. Here, the L-side superimposing unit 202, the L-side data modifying unit 203, the L-side α edge detecting unit 204, and the L-side α edge position determining unit 205 constitute an L-side output signal generating unit. Likewise, the R-side superimposing unit 208, the R-side data modifying unit 209, the R-side α edge detecting unit 210, and the R-side α edge position determining unit 211 constitute an R-side output signal generating unit.

The L-side video signal and the R-side video signal that are input to the synthesizing unit 14 are signals having the 4:2:2 chrominance format. On the other hand, the L-side graphics signal and the R-side graphics signal that are input to the synthesizing unit 14 are signals having the 4:4:4 chrominance format. However, in order to synthesize the video signal and the graphics signal, there is a need to unify these chrominance formats. Embodiment 1 describes an example of unifying the chrominance formats to the 4:4:4 format.

First, a description is given of a process of synthesizing an L-side video signal and an L-side graphics signal. The L-side chrominance dividing unit 201 converts the chrominance format of the L-side video signal from the 4:2:2 format to the 4:4:4 format (S21).

The L-side superimposing unit 202 superimposes (synthesizes) the L-side video signal and the L-side graphics signal to generate an L-side output signal (S22). This superimposition process is performed based on a blending coefficient. A blending coefficient (transparency information) is information indicating whether each of the pixels in the L-side output signal is generated using an L-side video signal or using an L-side graphics signal.

Next, the L-side α edge detecting unit 204 detects a horizontal edge position of a blending coefficient (α value: transparency information) included in the L-side graphics signal (S23). In the case where an edge position is detected (Yes in S23), a transition to Step S24 is made. In the case where an edge position is not detected (No in S23), a transition to Step S26 is made.

The L-side α edge position determining unit 205 determines whether the horizontal edge position detected by the L-side α edge detecting unit 204 is an even pixel position or an odd pixel position (S24). In the case where the edge position is an odd pixel position (Yes in S24), a transition to Step S25 is made. In the opposite case where the edge position is an even pixel position (No in S24), a transition to Step S26 is made.

The L-side data modifying unit 203 modifies the L-side output signal obtained by superimposing the L-side video signal and the L-side graphics signal, based on the result of the determination by the L-side α edge position determining unit 205 (S25).

The L-side chrominance synthesizing unit 206 converts the chrominance format of the L-side output signal modified by the L-side data modifying unit 203 from the 4:4:4 format to the 4:2:2 format, and outputs the resulting L-side output signal (S26).

The process of synthesizing the R-side video signal and the R-side graphics signal is the same as the process of synthesizing the L-side video signal and the L-side graphics signal. Thus, no detailed description thereof is repeated here.

The R-side chrominance dividing unit 207 converts the chrominance format of the R-side video signal from the 4:2:2 format to the 4:4:4 format. The R-side superimposing unit 208 superimposes the R-side video signal and the R-side graphics signal. The R-side α edge detecting unit 210 detects a horizontal edge position of a blending coefficient (α value: transparency information) included in the R-side graphics signal. The R-side α edge position determining unit 211 determines whether the horizontal edge position detected by the R-side α edge detecting unit 210 is an even pixel position or an odd pixel position. The R-side data modifying unit 209 modifies the R-side output signal obtained by superimposing the R-side video signal and the R-side graphics signal, based on the result of the determination by the R-side α edge position determining unit 211. The R-side chrominance synthesizing unit 212 converts the chrominance format of the R-side output signal modified by the R-side data modifying unit 209 from the 4:4:4 format to the 4:2:2: format, and outputs the resulting R-side output signal.

Next, with reference to FIG. 3 to FIG. 6, a description is given of a method of synthesizing the L-side video signal and the L-side graphics signal. The method of synthesizing the R-side video signal and the R-side graphics signal is the same, and thus no description thereof is repeated.

Figure 4:
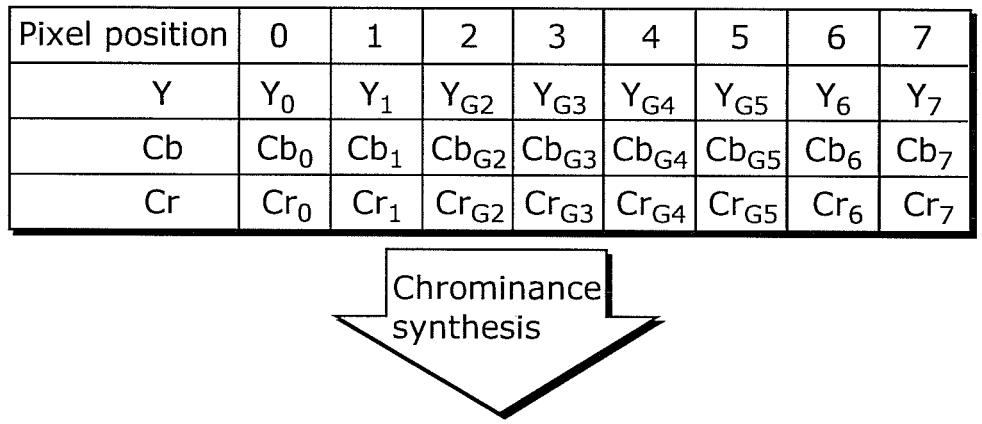
FIG. 4 is a diagram illustrating an L-side output signal obtained by synthesizing the L-side video signal and the L-side graphics signal in FIG. 3.

First, each of FIG. 3 and FIG. 4 shows an example of synthesizing the L-side video signal and the L-side graphics signal when the horizontal edge position of the blending coefficient (α value: transparency information) is an even pixel position. FIG. 3 is a diagram illustrating an example of a pixel value (Y/Cb/Cr) of each of the L-side video signal and the L-side graphics signal. FIG. 4 is a diagram illustrating an example of the pixel value of the L-side output signal.

As shown in the upper and middle tables in FIG. 3, the L-side chrominance dividing unit 201 converts the L-side video signal having the 4:2:2 format output from the video decoder 12 into the L-side video signal having the 4:4:4 format. In the L-side video signal having the 4:2:2 format, each of horizontally adjacent two pixels (for example, the pixel positions 0 and 1) is represented by a common chrominance signal ($Cb_{01}/Cr_{01}$). In this case, the L-side chrominance dividing unit 201 converts the common chrominance signal $Db_{01}$ into a chrominance signal $Cb_0$ and $Cb_1$ each unique for a corresponding one of the pixels. At this time, it is possible to copy the chrominance signal $Cb_{01}$ to each of $Cb_0$ and $Cb_1$. Alternatively, it is possible to generate separate chrominance signals $Cb_0$ and $Cb_1$ by performing weighted calculation additionally using the chrominance signal of another adjacent pixel. The same processing is performed also on the chrominance signal $Cr_{01}$ and the chrominance signals of the other pixels.

As shown in the lower table in FIG. 3, the L-side graphics signal includes a pixel value (Y/Cb/Cr) in the 4:4:4 format and the blending coefficient (α value: transparency information) for each pixel. Blending coefficients in this example change from 0 to 1 at the position (an even pixel position) between the pixel position 1 and the pixel position 2, and change from 1 to 0 at the position (an even pixel position) between the pixel position 5 and the pixel position 6. Here, the pixel position at which the blending coefficient changes is referred to as a horizontal edge position. The blending coefficient is included in the L-side graphics signal in the aforementioned exemplary case. However, cases are not limited thereto, and it is possible to obtain the L-side graphics signal and the blending coefficient separately from the stream processing unit 11.

FIG. 4 shows the result of superimposing an L-side graphics signal having the 4:4:4 format and an L-side video signal having the 4:4:4 format; that is, the result is the L-side output signal having the 4:4:4 format. The L-side superimposing unit 202 synthesizes the L-side video signal and the L-side graphics signal, based on the blending coefficient. More specifically, the L-side superimposing unit 202 sets, to a pixel at which the blending coefficient α is 0, a pixel value of a pixel that is of the L-side video signal and corresponds to (is collocated with) the pixel at which the blending coefficient α is 0, and sets, to a pixel at which the blending coefficient α is 1, a pixel value of the pixel that is of the L-side graphics signal and corresponds to (is collocated with) the pixel at which the blending coefficient α is 1, and thereby generating the L-side output signal.

The L-side chrominance synthesizing unit 206 converts the chrominance signal of the generated L-side output signal from the 4:4:4 format to the 4:2:2 format, and outputs the resulting chrominance signal to the video output unit 15. The chrominance signal having the 4:2:2 format can be generated by performing a process of interpolation between L-side video signals or between the L-side graphics signals. Specific examples of interpolation processes are not limited. For example, a common chrominance signal $Cb_{01}$ is generated by performing addition averaging of the chrominance signals $Cb_0$ and $Cb_1$ of the respective adjacent two pixels (for example, at the pixel positions 0 and 1). This is true of the other chrominance signal $Cr_{01}$ and the other pixels.

Figure 6:
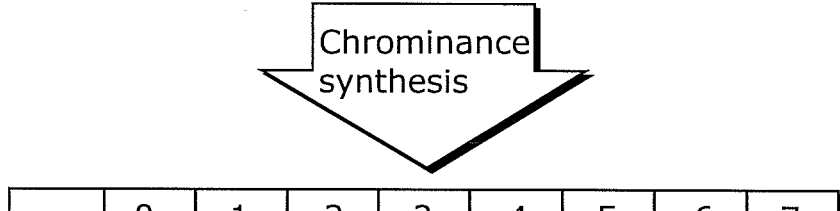
FIG. 6 is a diagram illustrating an L-side output signal obtained by synthesizing the L-side video signal and the L-side graphics signal in FIG. 5.

Next, each of FIG. 5 and FIG. 6 shows an example of synthesizing the L-side video signal and the L-side graphics signal when the horizontal edge position of the blending coefficient ($\alpha$ value) is an odd pixel position. FIG. 5 is a diagram illustrating an example of pixel value of each of the L-side video signal and the L-side graphics signal. FIG. 6 is a diagram illustrating an example of the pixel value of the L-side output signal.

In FIG. 5, the L-side video signal having the 4:2:2 format output from the video decoder 12 is converted into the L-side video signal having the 4:4:4 format by the L-side chrominance dividing unit 201. As shown in FIG. 5, the L-side graphics signal includes pixel values in the 4:4:4 format and the blending coefficient ($\alpha$ value: transparency information) for each pixel. The blending coefficients in this example change from 0 to 1 at the position (an odd pixel position) between the pixel position 0 and the pixel position 1, and change from 1 to 0 at the position (an odd pixel position) between the pixel position 4 and the pixel position 5.

FIG. 6 shows the result of superimposing an L-side graphics signal having the 4:4:4 format and an L-side video signal having the 4:4:4 format; that is, the result is the L-side output signal having the 4:4:4 format. The superimposed L-side output signal is output as the L-side output signal having the 4:2:2 format by the L-side chrominance synthesizing unit 206 to the video output unit 15.

In the case where the edge position of the blending coefficient ($\alpha$ value) is an odd pixel position, the chrominance signal having the 4:2:2 format must be subjected to a process of interpolation between an L-side video signal and an L-side graphics signal when the chrominance signal is generated, and thus an unexpected chrominance signal is generated.

In the signal processing of a three-dimensional video, when the horizontal edge position of the aforementioned blending coefficient of one of the L-side output signal and the R-side output signal is an even pixel position and the horizontal edge position of the other is an odd pixel position, an unexpected chrominance signal is generated at only one side, and the unexpected chrominance signal is viewed as flickering in the resulting video. In particular, in the case of superimposing graphics signals indicating subtitles, a menu, or the like approximately the same in content (different only by the parallax), such flickering in the video is especially noticeable.

Here, operations performed by the synthesizing unit 14 of the three-dimensional video reproduction apparatus 1 is described with reference to FIGS. 7A, 7B, 8A, and 8B.

FIG. 7A is a diagram illustrating examples of the pixel values of an L-side video signal and the pixel values of an L-side graphics signal in this embodiment. FIG. 7B is a diagram illustrating examples of the pixel value of an R-side video signal and the pixel value of an R-side graphics signal in this embodiment. FIG. 8A is a diagram illustrating an L-side output signal obtained by synthesizing the L-side video signal and the L-side graphics signal in FIG. 7A. FIG. 8B is a diagram illustrating a process of modifying an R-side output signal obtained by synthesizing the R-side video signal and the R-side graphics signal in FIG. 7B.

A consideration is given of a case of superimposing the L-side video signal output from the L-side chrominance dividing unit 201 and the L-side graphics signal output from the graphics decoder unit 13, and superimposing the R-side video signal output from the R-side chrominance dividing unit 207 and the R-side graphics signal output from the R-side graphics decoder unit 13.

At this time, the left-side blending coefficient $\alpha$ is 1 at the range from the pixel position 4 to the pixel position 7, and 0 at the other pixel positions. On the other hand, the right-side blending coefficient $\alpha$ is 1 at the range from the pixel position 1 to the pixel position 4, and 0 at the other pixel positions.

When superimposing the video signal and the graphics signal at each of the right and left sides, the graphics signals in the range from the pixel position 4 to the pixel position 7 of the L-side output signal are identical to the graphics signals in the range from the pixel position 1 to the pixel position 4 of the R-side output signal, but the pixel positions of the same graphics signals are different by the parallax, which enables three-dimensional viewing.

When the L-side chrominance synthesizing unit 206 converts the chrominance format of the L-side output signal from the 4:4:4 format to the 4:2:2 format, the chrominance signals (Cb, Cr) in the range from the pixel position 0 to the pixel position 7 can be generated by performing a process of interpolation between the original L-side video signals or between the original L-side graphics signals.

Likewise, when the R-side chrominance synthesizing unit 212 converts the chrominance format of the R-side output signal from the 4:4:4 format to the 4:2:2 format, the chrominance signals (Cb, Cr) at the pixel positions 2 and 3 and the pixel positions 6 and 7 can be generated by performing a process of interpolation between the original R-side video signals or between the original R-side graphics signals. However, each of the chrominance signals (Cb, Cr) at the pixel positions 0 and 1 and the pixel positions 4 and 5 must be generated by performing a process of interpolation between an original R-side video signal and a corresponding R-side graphics signal. For this reason, an unexpected chrominance signal may be calculated. Particularly in the case of three-dimensional viewing, the difference in the L-side output signal is viewed as noticeable flickering.

To suppress such flickering, the R-side $\alpha$ edge detecting unit 210 detects a sudden rise (a change from 0 to 1) or a sudden fall (a change from 1 to 0) between blending coefficients ($\alpha$ values: transparency information). Next, in the case where the chrominance format of the R-side output signal is converted from the 4:4:4 format to the 4:2:2: format, the R-side $\alpha$ edge position determining unit 211 determines whether or not the detected edge position is an odd pixel position, that is, whether or not the chrominance signals need to be subjected to a process of interpolation between the R-side video signal and the R-side graphics signal.

In the case where the edge position is an odd pixel position, the R-side data modifying unit 209 either replaces the pixel value (Y/Cb/Cr) of the original R-side video signal in horizontally adjacent two pixels to be subjected to the interpolation process with the pixel value of the original R-side graphics signal or replaces the pixel value of the original R-side graphics signal with the pixel value (Y/Cb/Cr) of the original R-side video signal, in order to prevent an interpolation process on the chrominance signals between the R-side video signal and the R-side graphics signal.

For example, in FIG. 8B, the position between the pixel positions 1 and 2 and the position between the pixel positions 5 and 6 are detected as the edge positions. As the result of the $\alpha$ edge position determination process, the chrominance signals are subjected to the interpolation process between the R-side video signal and the R-side graphics signal. Here, the pixel value ($Y_{RO}/Cb_{RO}/Cr_{RO}$) at the pixel position 0 is replaced with the pixel value ($Y_{GO}/Cb_{GO}/Cr_{GO}$) at the pixel position 1, and the pixel value at the pixel position 5 is replaced with the pixel value at the pixel position 4.

Next, the R-side chrominance synthesizing unit 212 converts the chrominance format of the R-side output signal from the 4:4:4 format to the 4:2:2: format. In other words, the R-side chrominance synthesizing unit 212 generates the common chrominance signal between the horizontally adjacent two pixels using only one of the R-side video signal and the R-side graphics signal. In this way, it is possible to prevent an unexpected chrominance signal from being calculated. As a result, it is possible to suppress flickering stemming from the difference between the L-side output signal and the R-side output signal in the three-dimensional viewing.

Embodiment 1 provides an advantageous effect of reducing turbulence at the graphics boundary that occurs in three-dimensional viewing due to a right-left difference in positions at which blending coefficients ($\alpha$ values: transparency information) suddenly change, by detecting the $\alpha$ edge, and modifying one of the pixel values at the $\alpha$ edge.

In the modification process in this exemplary embodiment, one of the pixel value of the R-side video signal and the pixel value of the R-side graphics signal that constitute horizontally adjacent two pixels is replaced with the pixel value of the other one. However, replacement methods are not limited thereto, and any other method may be used.

For example, it is possible to perform a weighted addition by biasing weights (a synthesis ratio) for the pixel value of the R-side video signal and the pixel value of the R-side graphics signal that constitute horizontally adjacent two pixels in favor of one of these signals. In other words, although the above example is an extreme case where the weights are 10:0, but specific weighted coefficients are not limited as long as the weights are biased with a synthesis ratio of 6:4, 7:3, 8:2, 9:1, or the like. Here, the weights may be biased in favor of one of these R-side video signal and R-side graphics signal, but it is desirable that the weighted coefficient of the R-side graphics signal is larger than the other, and it is optimum that the weighted coefficient of the R-side graphics signal is 10 and the weighted coefficient of the R-side video signal is 0.

Although the modification process is performed on an R-side output signal in this embodiment, it is possible to perform such modification process on an L-side output signal.

Embodiment 2

Figure 9:
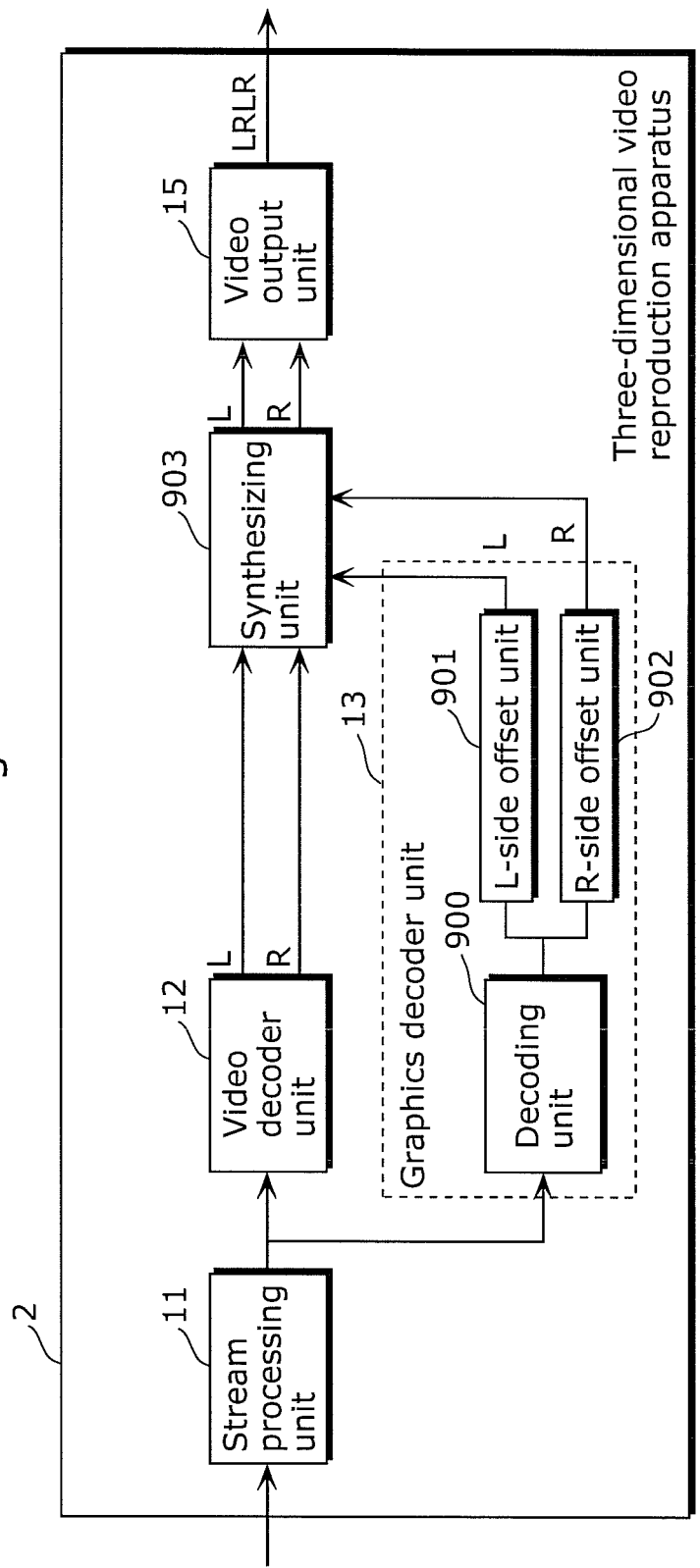
FIG. 9 is a block diagram showing a configuration of a three-dimensional video reproduction apparatus according to Embodiment 2.

Hereinafter, with reference to FIG. 9, a description is given of a three-dimensional video reproduction apparatus according to Embodiment 2 of the present invention. FIG. 9 is a block diagram showing a configuration of a three-dimensional video reproduction apparatus according to this embodiment. The three-dimensional video reproduction apparatus 2 includes: a stream processing unit 11, a video decoder unit 12, a decoding unit 900, an L-side offset unit 901, an R-side offset unit (parallax adding unit) 902, a synthesizing unit (parallax adding unit) 903, and a video output unit 15. The decoding unit 900, the L-side offset unit 901, and the R-side offset unit 902 constitute a graphics decoder unit. In addition, the same structural elements as in Embodiment 1 are assigned with the same numerical references, and no detailed descriptions thereof are repeated.

The stream processing unit 11 obtains a 3D stream, divides the obtained 3D stream into a video stream and a graphics stream. Next, the stream processing unit 11 outputs the video stream to the video decoder unit 12, and the graphics stream to the decoding unit 900.

The video decoder unit 12 decodes the video stream obtained from the stream processing unit 11 to generate an L-side (left-eye) video signal and an R-side (right-eye) video signal.

On the other hand, in the case where the graphics stream conforms to the one-plane offset mode, and each of the L-side/R-side video signals includes the common graphics signal (plane graphics signal) and a left-right horizontal shift amount (offset or parallax) corresponding to the common graphics signal, the decoding unit 900 decodes the graphics stream obtained from the stream processing unit 11 to generate the left-right common plane graphics signal. Next, the decoding unit 900 outputs the generated plane graphics signal and the horizontal shift amounts (the left-eye side horizontal shift amount and the right-eye side horizontal shift amount) to the L-side offset unit 901 and the R-side offset unit 902.

Here, the left-eye side horizontal shift amount is the horizontal shift amount of the plane graphics signal for generating an L-side graphics signal. Likewise, the right-eye side horizontal shift amount is the horizontal shift amount of the plane graphics signal for generating an R-side graphics signal. The left-eye side horizontal shift amount and the right-eye side horizontal shift amount may be included in, for example, the graphics streams in addition to the plane graphics signals.

The L-side offset unit 901 shifts the plane graphics signal to one of the horizontal directions (for example, in the left direction) according to the left-eye side horizontal shift amount, in order to generate the L-side graphics signal. On the other hand, the R-side offset unit 902 shifts the plane graphics signal to the other horizontal direction (for example, in the right direction) according to the right-eye side horizontal shift amount, in order to generate the R-side graphics signal. Next, the L-side offset unit 901 and the R-side offset unit 902 outputs, to the synthesizing unit 903, the generated L-side graphics signal and R-side graphics signal.

The synthesizing unit 903 synthesizes the L-side video signal obtained from the video decoder unit 12 and the L-side graphics signal obtained from the L-side offset unit 901 to generate an L-side output signal. Likewise, the synthesizing unit 903 synthesizes the R-side video signal obtained from the video decoder unit 12 and the R-side graphics signal obtained from the R-side offset unit 902 to generate an R-side output signal. Next, the synthesizing unit 903 outputs, to the video output unit 15, the generated L-side output signal and R-side output signal.

The synthesizing unit 903 according to Embodiment 2 may be intended to perform the same processes performed by the synthesizing unit 14 according to Embodiment 1, or may be intended to perform different processes. For example, the synthesizing unit 903 may be the one obtained by eliminating from the synthesizing unit 14 the following: the L-side data modifying unit 203, the L-side $\alpha$ edge detecting unit 204, the L-side $\alpha$ edge position determining unit 205, the R-side data modifying unit 209, the R-side $\alpha$ edge detecting unit 210, and the R-side $\alpha$ edge position determining unit 211.

The video output unit 15 alternately outputs, for each frame (picture), the L-side output signal and the R-side output signal obtained from the synthesizing unit 903, according to a predetermined transmission scheme.

At this time, in the case of generating an L-side graphics signal by shifting the plane graphics signal by an odd number of pixels and generating the R-side graphics signal by shifting the plane graphics signal by an even number of pixels, an unexpected color signal occurs at the graphics boundary in one of the L-side output signal and R-side output signal generated by the synthesizing unit 14. For this reason, in the three-dimensional viewing, flickering occurs at the boundary between the graphics signal and the video signal.

To suppress such flickering, in Embodiment 2, in the case where one of the left-eye side horizontal shift amount (L-side offset) for generating an L-side graphics signal and the right-eye side horizontal shift amount (R-side offset) for generating an R-side graphics signal is an odd number of pixels, and the other one is an even number of pixels, one of the left- and right-side horizontal shift amounts is unified to the other. In other words, one of the left- and right-eye side horizontal shift amounts is overwritten by the other. In this way, the L-side graphics signal and the R-side graphics signal are generated by shifting the plane graphics signals by the same number of pixels in the horizontally opposite directions to generate the respective R and L sides. As a result, it is possible to reduce flickering at the boundary between the graphics signal and the video signal in three-dimensional viewing.

Embodiment 2 provides an advantageous effect of reducing turbulence at the graphics boundary that occurs in three-dimensional viewing due to a right-left difference in positions at which blending coefficients (α values: transparency information) suddenly change, by detecting the α edge, and modifying one of the pixel values at the α edge.

It is to be noted that typical examples of the three-dimensional video reproduction apparatuses 1 and 2 include a BD (Blu-ray Disc) player 100 as shown in FIG. 10. For example, the BD player 100 reads a 3D stream recorded on a BD, executes the above-described processes thereon, and outputs it to a TV (television image receiver) 200. However, the present invention is not limited thereto. The three-dimensional video reproduction apparatuses 1 and 2 may be a player which reads a 3D stream from another recording medium such as a DVD (Digital Versatile Disc). Alternatively, the three-dimensional video reproduction apparatuses 1 and 2 may be mounted at the TV 200 side. In this case, the TV 200 obtains a 3D stream through a broadcast wave, executes the above-described processes thereon, and displays the resulting 3D stream on the display unit.

(Variation)

Although the present invention has been described based on the above embodiments, the present invention is naturally not limited to those embodiments. The following cases are also included in the present invention.

Each of the aforementioned apparatuses is, specifically, a computer system including a microprocessor, a ROM, a RAM, a hard disk unit, a display unit, a keyboard, a mouse, and so on. A computer program is stored in the RAM or hard disk unit. The respective apparatuses achieve their functions through the microprocessor's operations according to the computer program. Here, the computer program is configured by combining plural instruction codes indicating instructions for the computer in order to achieve predetermined functions.

A part or all of the structural elements of the respective apparatuses may be configured with a single system-LSI (Large-Scale Integration). The system-LSI is a super-multi-function LSI manufactured by integrating constituent units on a single chip, and is specifically a computer system configured to include a microprocessor, a ROM, a RAM, and so on. A computer program is stored in the RAM. The system LSIs achieve their functions through the microprocessor's operations according to the computer program.

A part or all of the constituent elements constituting the respective apparatuses may be configured as an IC card which can be attached to and detached from the respective apparatuses or as a stand-alone module. The IC card or the module is a computer system configured from a microprocessor, a ROM, a RAM, and so on. The IC card or the module may also includes the aforementioned super-multi-function LSI. The IC card or the module achieves its functions through the microprocessor's operations according to the computer program. The IC card or the module may also be implemented to be tamper-resistant.

The present invention may be implemented as methods for executing the processing performed by the aforementioned apparatus. The present invention may be implemented as computer programs for executing the aforementioned method, using a computer, and may also be implemented as digital signals including the computer programs.

Furthermore, the present invention may also be implemented as computer programs or digital signals recorded on computer-readable recording media such as a flexible disc, a hard disk, a CD-ROM, an MO, a DVD, a DVD-ROM, a DVD-RAM, a BD (Blu-ray Disc), and a semiconductor memory. Furthermore, the present invention may also be implemented as the digital signals recorded on these recording media.

Furthermore, the present invention may also be implemented as the aforementioned computer programs or digital signals transmitted via a telecommunication line, a wireless or wired communication line, a network represented by the Internet, a data broadcast, and so on.

The present invention may also be implemented as a computer system including a microprocessor and a memory, in which the memory stores the aforementioned computer program and the microprocessor operates according to the computer program.

Furthermore, it is also possible to execute another independent computer system by transmitting the programs or the digital signals recorded on the aforementioned recording media, or by transmitting the programs or digital signals via the aforementioned network and the like.

The above-described embodiments and variations may be arbitrarily combined.

Although only some exemplary embodiments of the present invention have been described in detail above with reference to the drawings, but the present invention is not limited to those illustrated embodiments. Those skilled in the art will readily appreciate that various modifications and variations are possible in the illustrated embodiments without materially departing from the novel teachings and advantages of the present invention. Accordingly, all such modifications and variations are intended to be included within the scope of the present invention.

INDUSTRIAL APPLICABILITY

The present invention is applicable to three-dimensional video reproduction apparatuses which superimpose a sub video on a main video that is a three-dimensional video and reproduce the resulting three-dimensional video.

What is claimed is:
1. A three-dimensional video reproduction apparatus which reproduces a three-dimensional video, said apparatus comprising:
  a video decoder which decodes a video stream to generate a right-eye video signal and a left-eye video signal which have a parallax with respect to each other;
  a graphics decoder which decodes a graphics stream to generate a right-eye graphics signal and a left-eye graphics signal which have a parallax with respect to each other;

a synthesizing unit configured to synthesize the right-eye video signal and the right-eye graphics signal to generate a right-eye output signal, and synthesize the left-eye video signal and the left-eye graphics signal to generate a left-eye output signal; and an output unit configured to reproduce the three-dimensional video by alternately outputting the right-eye output signal and the left-eye output signal generated by said synthesizing unit, wherein said synthesizing unit is configured to:

generate a common chrominance signal by biasing a synthesis ratio of the right-eye video signal and the right-eye graphics signal in favor of one of the right-eye video signal and the right-eye graphics signal, in a case where (i) adjacent two pixels in the right-eye output signal are represented by the common chrominance signal and (ii) one of the adjacent two pixels is generated using the right-eye video signal and the other one of the adjacent two pixels is generated using the right-eye graphics signal; and generate a common chrominance signal by biasing a synthesis ratio of the left-eye video signal and the left-eye graphics signal in favor of one of the left-eye video signal and the left-eye graphics signal, in a case where (i) adjacent two pixels in the left-eye output signal are represented by the common chrominance signal and (ii) one of the adjacent two pixels is generated using the left-eye video signal and the other one of the adjacent two pixels is generated using the left-eye graphics signal.

2. The three-dimensional video reproduction apparatus according to claim 1, wherein each of the right-eye video signal and the left-eye video signal has a 4:2:2 format as a chrominance format, each of the right-eye graphics signal and the left-eye graphics signal has a 4:4:4 format as a chrominance format, said three-dimensional video reproduction apparatus further obtains transparency information indicating which one of the right-eye video signal and the right-eye graphics signal is used to generate each of the pixels of the right-eye output signal, and which one of the left-eye video signal and the left-eye graphics signal is used to generate each of the pixels of the left-eye output signal, said synthesizing unit includes:

a chrominance dividing unit configured to convert the chrominance format of each of the right-eye video signal and the left-eye video signal from the 4:2:2 format to the 4:4:4 format;

a right-eye output signal generating unit configured to generate the right-eye output signal having the 4:4:4 format as the chrominance format, by synthesizing the right-eye video signal and the right-eye graphics signal each having the 4:4:4 format as the chrominance format, according to the transparency information;

a left-eye output signal generating unit configured to generate the left-eye output signal having the 4:4:4 format as the chrominance format, by synthesizing the left-eye video signal and the left-eye graphics signal each having the 4:4:4 format as the chrominance format, according to the transparency information; and a chrominance generating unit configured to convert the chrominance format of each of the right-eye output signal and the left-eye output signal from the 4:4:4 format to the 4:2:2 format, said right-eye output signal generating unit is configured to detect, in the right-eye output signal, a position that is (i) a boundary between two adjacent pixels that are represented using the common chrominance signal and (ii) an edge position at which transparency information changes, and generate the common chrominance signal at the edge position by biasing the synthesis ratio of the right-eye video signal and the right-eye graphics signal in favor of one of the right-eye video signal and the right-eye graphics signal, and said left-eye output signal generating unit is configured to detect, in the right-eye output signal, a position that is (i) a boundary between two adjacent pixels that are represented using the common chrominance signal and (ii) an edge position at which transparency information changes, and generate the common chrominance signal at the edge position by biasing the synthesis ratio of the left-eye video signal and the left-eye graphics signal in favor of one of the left-eye video signal and the left-eye graphics signal.

3. The three-dimensional video reproduction apparatus according to claim 2, wherein said right-eye output signal generating unit is configured to generate the common chrominance signal at the edge position, using only one of the chrominance signals of the right-eye video signal and the right-eye graphics signal, and said left-eye output signal generating unit is configured to generate the common chrominance signal at the edge position, using only one of the chrominance signals of the left-eye video signal and the left-eye graphics signal.

4. The three-dimensional video reproduction apparatus according to claim 3, wherein said right-eye output signal generating unit is configured to generate the common chrominance signal at the edge position, using only the chrominance signal of the right-eye graphics signal, and the left-eye output signal generating unit is configured to generate the common chrominance signal at the edge position, using only the chrominance signal of the left-eye graphics signal.

5. A three-dimensional video reproduction apparatus which reproduces a three-dimensional video, said apparatus comprising:

a video decoder which decodes a video stream to generate a right-eye video signal and a left-eye video signal which have a parallax with respect to each other;

a graphics decoder which decodes a graphics stream to generate a right-eye graphics signal and a left-eye graphics signal which have a parallax with respect to each other;

a synthesizing unit configured to synthesize the right-eye video signal and the right-eye graphics signal to generate a right-eye output signal, and synthesize the left-eye video signal and the left-eye graphics signal to generate a left-eye output signal; and an output unit configured to reproduce the three-dimensional video by alternately outputting the right-eye output signal and the left-eye output signal generated by said synthesizing unit, wherein said graphics decoder includes:

a decoding unit configured to decode the graphics stream to generate (i) a plane graphics signal, (ii) a right-eye side horizontal shift amount that is a horizontal shift amount of the plane graphics signal for generating the right-eye graphics signal, and (iii) a left-eye side horizontal shift amount that is a horizontal shift amount of the plane graphics signal for generating the left-eye graphics signal; and a parallax adding unit configured to horizontally shift the plane graphics signal to one of directions by the right-eye side horizontal shift amount to generate the right-eye graphics signal, and horizontally shift the plane graphics signal to the other one of the directions by the left-eye side horizontal shift amount to generate the left-eye graphics signal, and said parallax adding unit is configured to overwrite one of the right-eye side horizontal shift amount and the left-eye side horizontal shift amount on the other one of the horizontal shift amounts, and then generate the right-eye graphics signal and the left-eye graphics signal, in the case where one of the right-eye side horizontal shift amount and the left-eye side horizontal shift amount is an even number of pixels and the other one of the horizontal shift amounts is an odd number of pixels.

6. A three-dimensional video reproduction method of reproducing a three-dimensional video, said method comprising:

decoding a video stream to generate a right-eye video signal and a left-eye video signal which have a parallax with respect to each other;

decoding a graphics stream to generate a right-eye graphics signal and a left-eye graphics signal which have a parallax with respect to each other;

synthesizing the right-eye video signal and the right-eye graphics signal to generate a right-eye output signal, and synthesizing the left-eye video signal and the left-eye graphics signal to generate a left-eye output signal; and reproducing the three-dimensional video by alternately outputting the right-eye output signal and the left-eye output signal generated in said synthesizing, wherein in said synthesizing:

a common chrominance signal is generated by biasing a synthesis ratio of the right-eye video signal and the right-eye graphics signal in favor of one of the right-eye video signal and the right-eye graphics signal, in a case where (i) adjacent two pixels in the right-eye output signal are represented by the common chrominance signal and (ii) one of the adjacent two pixels is generated using the right-eye video signal and the other one of the adjacent two pixels is generated using the right-eye graphics signal; and a common chrominance signal is generated by biasing a synthesis ratio of the left-eye video signal and the left-eye graphics signal in favor of one of the left-eye video signal and the left-eye graphics signal, in a case where (i) adjacent two pixels in the left-eye output signal are represented by the common chrominance signal and (ii) one of the adjacent two pixels is generated using the left-eye video signal and the other one of the adjacent two pixels is generated using the left-eye graphics signal.

7. An integrated circuit which reproduces a three-dimensional video, said integrated circuit comprising:

a video decoder which decodes a video stream to generate a right-eye video signal and a left-eye video signal which have a parallax with respect to each other;

a graphics decoder which decodes a graphics stream to generate a right-eye graphics signal and a left-eye graphics signal which have a parallax with respect to each other;

a synthesizing unit configured to synthesize the right-eye video signal and the right-eye graphics signal to generate a right-eye output signal, and synthesize the left-eye video signal and the left-eye graphics signal to generate a left-eye output signal; and an output unit configured to reproduce the three-dimensional video by alternately outputting the right-eye output signal and the left-eye output signal generated by said synthesizing unit, wherein said synthesizing unit is configured to:

generate a common chrominance signal by biasing a synthesis ratio of the right-eye video signal and the right-eye graphics signal in favor of one of the right-eye video signal and the right-eye graphics signal, in a case where (i) adjacent two pixels in the right-eye output signal are represented by the common chrominance signal and (ii) one of the adjacent two pixels is generated using the right-eye video signal and the other one of the adjacent two pixels is generated using the right-eye graphics signal; and generate a common chrominance signal by biasing a synthesis ratio of the left-eye video signal and the left-eye graphics signal in favor of one of the left-eye video signal and the left-eye graphics signal, in a case where (i) adjacent two pixels in the left-eye output signal are represented by the common chrominance signal and (ii) one of the adjacent two pixels is generated using the left-eye video signal and the other one of the adjacent two pixels is generated using the left-eye graphics signal.

* * * * *